Figure 1:
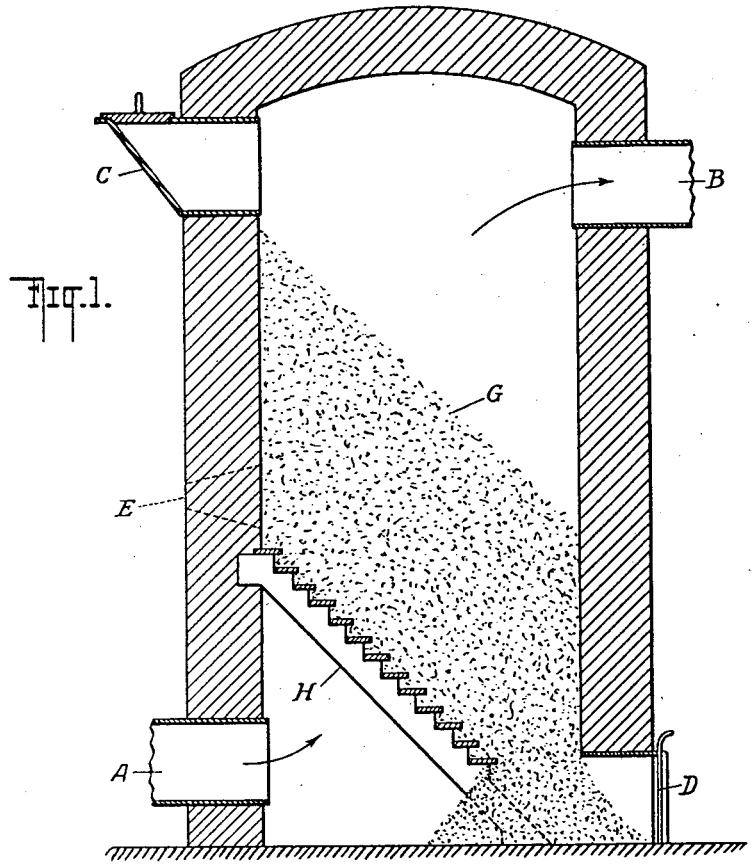

R. MESSEL.
PURIFICATION OF GASES CONTAINING SULFUR DIOXID.
APPLICATION FILED APR. 26, 1910.

1,078,937.

Patented Nov. 18, 1913.

WITNESSES

INVENTOR
Rudolph Messel
BY
ATTORNEYS

UNITED STATES PATENT OFFICE.

RUDOLPH MESSEL, OF LONDON, ENGLAND, ASSIGNOR, BY MESNE ASSIGNMENTS, TO GENERAL CHEMICAL COMPANY, OF NEW YORK, N. Y., A CORPORATION OF NEW YORK.

PURIFICATION OF GASES CONTAINING SULFUR DIOXID.

1,078,937.     Specification of Letters Patent.     Patented Nov. 18, 1913.

Application filed April 26, 1910. Serial No. 557,644.

*To all whom it may concern:*

Be it known that I, RUDOLPH MESSEL, chemical manufacturer, a subject of the King of Great Britain, residing at London, England, have invented new and useful Improvements in the Purification of Gases Containing Sulfur Dioxid, of which the following is a specification.

My invention relates to processes wherein sulfur, or sulfur-yielding material, such for instance as pyrites, is burned for the production of sulfur dioxid to be used for conversion into sulfuric anhydrid, or sulfuric acid, or for any other required purpose.

Some sulfuric acid is present with the sulfur dioxid and this is objectionable, and, in the manufacture of sulfuric anhydrid and sulfuric acid, has to be removed, as, if allowed to remain, it would act as a carrier of any impurities present and would also act injuriously on the metal of the apparatus, and, in the catalytic process, would also injuriously affect the contact substance. Its removal has been effected by washing the gases with water, or with sulfuric acid, or by filtering, and thus, when the material from which the sulfur dioxid is obtained is such that impurities are present, the sulfuric acid separated is so contaminated that its commercial value is materially depreciated, and the amount of relatively pure sulfur dioxid and sulfuric anhydrid and sulfuric acid obtained is correspondingly decreased.

My invention has for its object to increase the yield of sulfur dioxid from mixtures thereof with sulfuric acid and also correspondingly increase the yield of good commercial sulfuric anhydrid and sulfuric acid which may be made therefrom, and this I effect by subjecting the mixture to such treatment that the sulfuric acid therein is reduced to sulfur dioxid. This reduction can be effected by any suitable means, such for instance as by treating the gases in a heated state with carbon, or carbonaceous matter, or other suitable reducing agent. I may, for example, carry out my invention by passing the sulfurous gases containing sulfuric acid over granulated gas coke maintained at a temperature of above three hundred degrees centigrade, say, at about four hundred and twenty-five degrees centigrade, but I do not limit myself to any particular method of effecting the reduction of the sulfuric acid.

The sulfur dioxid obtained from the sulfuric acid by reduction as aforesaid can then be dealt with, if required in the usual or any suitable way with the rest of the sulfur dioxid and the process according to my invention therefore has the advantage of increasing the yield of sulfur dioxid and, in the manufacture of good commercial sulfuric acid, or sulfuric anhydrid, of correspondingly increasing the yield thereof.

The gases can be brought to their proper reaction temperatures by any suitable means. Dust which may be present in the gases may be removed therefrom before they are subjected to the said reducing action upon the contained sulfuric acid.

Figure 2:
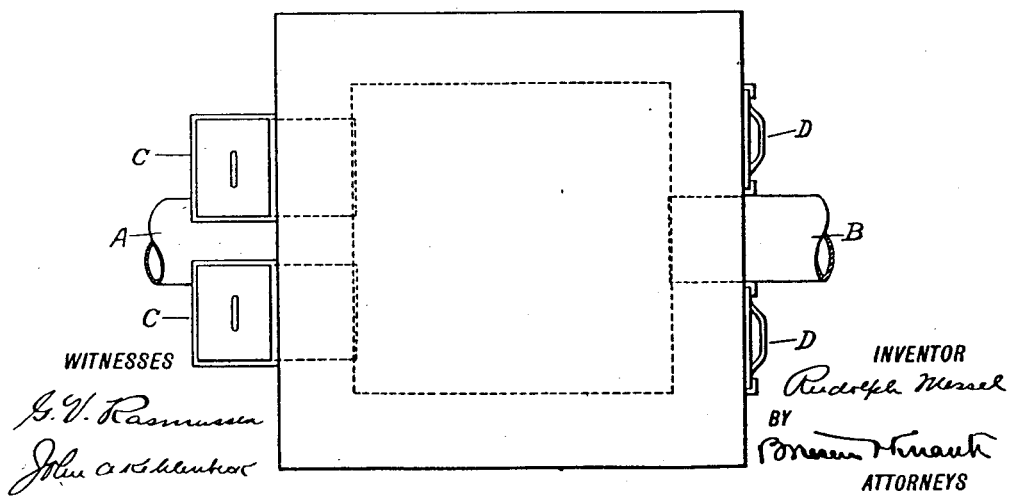

In the accompanying drawings which illustrate one form of apparatus which may be used for carrying out my improved process Figure 1 is a cross sectional view and Fig. 2 is a plan view of said apparatus.

In the said drawings A represents the inlet for the sulfurous gases and B the outlet therefor.

C is a chute through which the granulated gas coke G may be introduced into the apparatus, while D indicates a door for closing an opening through which said coke G may be removed. The said coke G in the form of apparatus illustrated is supported on a stepped or inclined grate H and may be stirred or otherwise actuated through an opening E in the one wall of the apparatus.

Now what I claim is:—

1. The process of purifying gases containing sulfur dioxid from sulfuric acid by passing the said gases over a reducing agent at a temperature above 300° C. and below that at which the reducing agent used will reduce sulfur dioxid to free sulfur.

2. The process of purifying gases containing sulfur dioxid from sulfuric acid by passing the said gases over granulated gas coke at a temperature over 300° C. and below that at which the gas coke will reduce sulfur dioxid to free sulfur.

In testimony whereof I have hereunto set my hand in the presence of two subscribing witnesses.

RUDOLPH MESSEL.

Witnesses:
R. WESTACOTT,
R. J. WILLIAMS.